(12) United States Patent
Gale et al.

(10) Patent No.: US 9,647,486 B2
(45) Date of Patent: May 9, 2017

(54) SYSTEM AND METHOD FOR CONTROLLING CHASSIS COUPLING CURRENT

(75) Inventors: Allan Roy Gale, Livonia, MI (US); Paul Theodore Momcilovich, Tecumseh, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1884 days.

(21) Appl. No.: 12/893,000

(22) Filed: Sep. 29, 2010

(65) Prior Publication Data

US 2011/0166728 A1    Jul. 7, 2011

(51) Int. Cl.
| G06F 7/00 | (2006.01) |
| H02J 7/00 | (2006.01) |
| B60R 16/02 | (2006.01) |
| H02J 7/02 | (2016.01) |
| B60L 3/00 | (2006.01) |
| B60L 11/18 | (2006.01) |
| B60R 25/00 | (2013.01) |
| H02J 7/04 | (2006.01) |

(52) U.S. Cl.
CPC ............ *H02J 7/027* (2013.01); *B60L 3/0069* (2013.01); *B60L 11/1824* (2013.01); *B60R 25/00* (2013.01); *H02J 7/045* (2013.01); *Y02T 10/7005* (2013.01); *Y02T 10/7072* (2013.01); *Y02T 90/12* (2013.01); *Y02T 90/121* (2013.01); *Y02T 90/14* (2013.01)

(58) Field of Classification Search
USPC ............................................ 701/22; 320/160
See application file for complete search history.

(56) References Cited

U.S. PATENT DOCUMENTS

| 5,367,244 | A | 11/1994 | Rose et al. | |
| 5,633,576 | A | 5/1997 | Rose et al. | |
| 5,703,466 | A | 12/1997 | Honda et al. | |
| 6,781,348 | B2 | 8/2004 | Yokohama | |
| 6,963,186 | B2 | 11/2005 | Hobbs | |
| 2009/0160368 | A1* | 6/2009 | Godbole | ........................ 315/307 |
| 2012/0032634 | A1* | 2/2012 | Cavanaugh | ................... 320/109 |

* cited by examiner

*Primary Examiner* — Mussa A Shaawat
*Assistant Examiner* — Kyung Kim
(74) *Attorney, Agent, or Firm* — David B. Kelley; Brooks Kushman P.C.

(57) ABSTRACT

An automotive vehicle may include a battery charger that receives electrical energy, via an electrical connection including a ground wire, from an electrical source remote from the vehicle, and outputs the electrical energy to at least one electrical load. The vehicle may also include at least one controller that commands a change in the electrical energy output by the battery charger. The battery charger, in response to the command, may control a rate of change in the electrical energy output such that a coupling current to the ground wire resulting from the change in the electrical energy output by the battery charger has a magnitude less than a predetermined threshold.

15 Claims, 3 Drawing Sheets

SYSTEM AND METHOD FOR CONTROLLING CHASSIS COUPLING CURRENT

BACKGROUND

A ground fault circuit interrupter (GFCI) is an electrical wiring device that disconnects a circuit whenever it detects that the electric current is not balanced between the energized conductor and the return neutral conductor.

SUMMARY

An automotive vehicle having a chassis may include a battery and a battery charger having an electrical input and an electrical output. The electrical input is electrically connected with the chassis and receives electrical energy from a source remote from the vehicle. The electrical output is electrically coupled with the chassis and provides at least a portion of the received electrical energy to the battery. The vehicle may also include a controller that commands an increase or decrease in the electrical energy provided by the battery charger to the battery.

The battery charger, in response to the command from the controller, may control a rate of change in the electrical energy provided by the battery charger such that a current that flows from the electrical output, through the chassis and to the electrical input resulting from the change in the electrical energy provided by the battery charger has a magnitude less than a predetermined threshold.

DETAILED DESCRIPTION

Figure 1A:
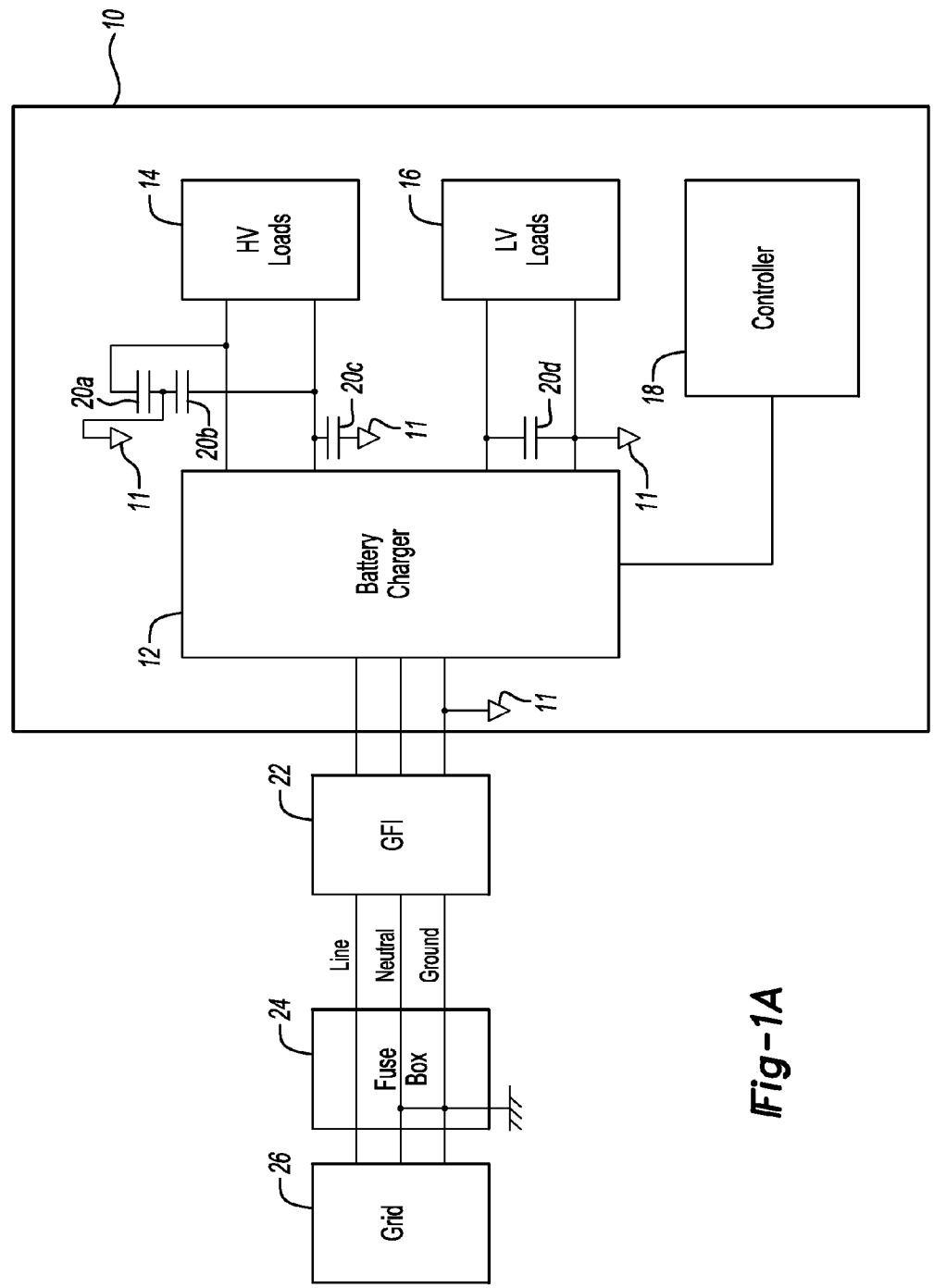
FIGS. 1A and 1B are block diagrams of an automotive vehicle electrically connected with an electrical grid.

Referring to FIG. 1A, a vehicle 10 (e.g., battery electric vehicle, plug-in hybrid electric vehicle, etc.) includes a chassis 11, a battery charger 12, high voltage loads 14 (e.g., a traction battery, electric machine, etc.) and low voltage loads 16 (e.g., a +12V battery, logic circuitry, etc.) The battery charger 12 is electrically connected with the high voltage loads 14 and low voltage loads 16. The vehicle 10 also includes a controller 18. The battery charger 12 is in communication with/under the control of the controller 18. Other arrangements including a different number of loads, chargers, controllers, etc. are also possible.

The electrical connections between the battery charger 12 and loads 14, 16 are electrically coupled to the chassis 11 through actual and/or parasitic capacitances 20a-20d. Current, I, may flow from these electrical connections, through the capacitances 20a-20d and to the chassis 11 according to the relation:

$$I = C dV/dT \qquad (1)$$

where C is the capacitance in the electrical path between the electrical connection and the chassis 11, and dV/dT is the change in voltage per unit time on the electrical connection.

The battery charger 12 is configured to receive electrical power from an electrical grid 26. That is, the vehicle 10 may be plugged in to a wall outlet such that the battery charger 12 is electrically connected with the electrical grid 26 via a ground fault interrupter (GFI) 22 (or similar device) and fuse box 24. Line, neutral and ground wires are shown, in this example, electrically connecting the battery charger 12 and grid 26. The ground wire is electrically connected to the chassis 11 within the vehicle 10. The ground wire is also electrically connected with the neutral wire and ground at the fuse box 24. Other electrical configurations, such as a 240 V arrangement with L1, L2 and ground wires, are of course also possible.

When the vehicle 10 is plugged in, the controller 18 may command the battery charger 12 to provide electrical energy to either/both of the loads 14, 16 (for battery charging, etc.) Conventionally, a step change in current may be commanded by the controller 18 under such circumstances. A step change in current, however, results in a step change in voltage on the electrical connections between the battery charger 12 and loads 14, 16.

Figure 1B:
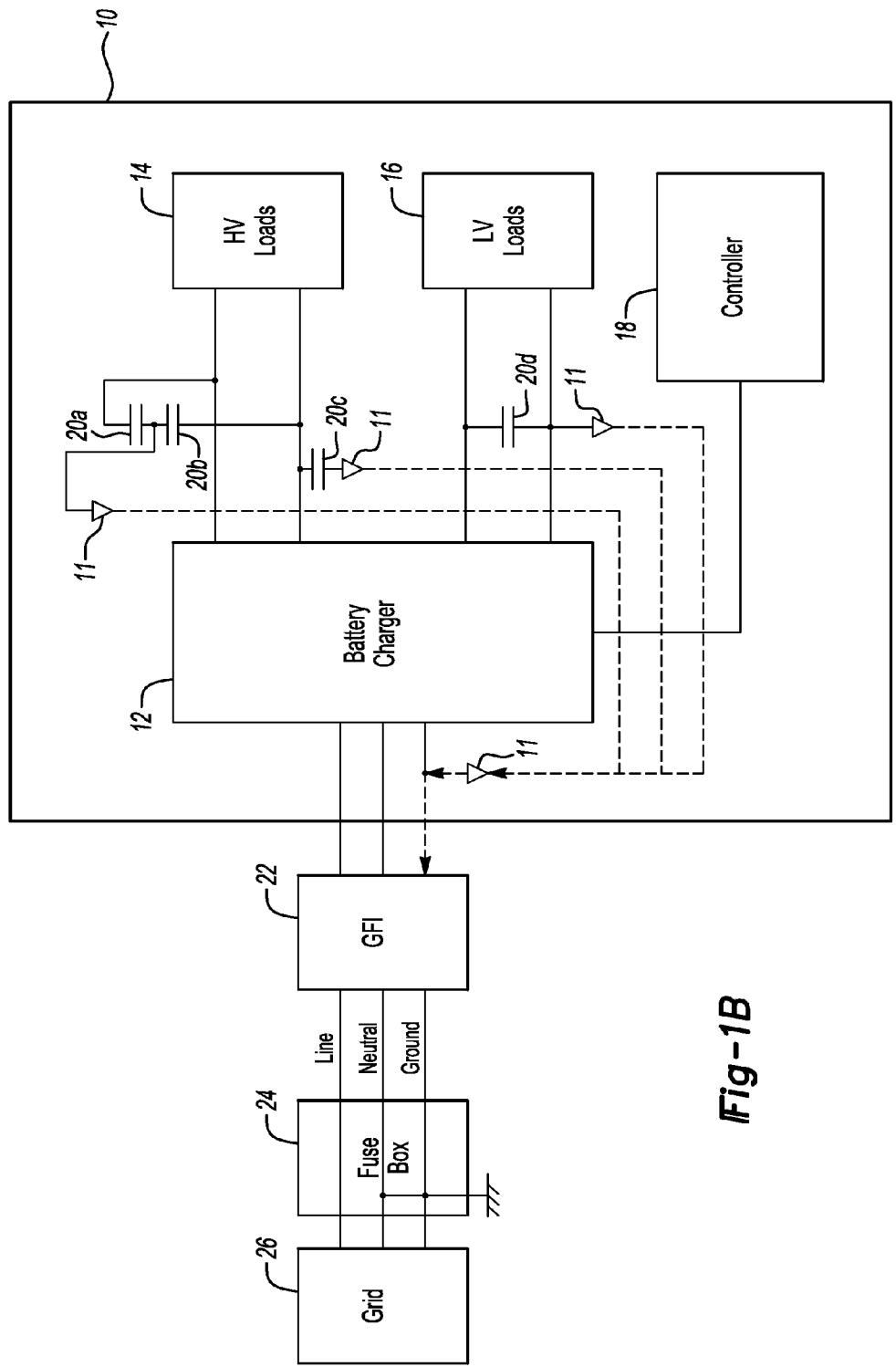

Referring to FIG. 1B (and as mentioned above), current (as indicated by dashed line) may flow from the electrical connections between the battery charger 12 and the loads 14, 16, through the capacitances 20a-20d and to the chassis 11. Current may then flow from the chassis 11, through the ground wire and to the GFI 22. According to (1), this chassis coupling current may exceed the 5 mA trip setting on the GFI 22 if the change in voltage per unit time on the electrical connections between the battery charger 12 and loads 14, 16 is large enough. The step change in current (and voltage) described above may thus result in a chassis coupling current that exceeds 5 mA, resulting in a tripped GFI 22 and a discontinuation of battery charging.

Certain embodiments disclosed herein may control the rate at which current/voltage on the electrical connections between the battery charger 12 and the loads 14, 16 is altered to, for example, keep the coupled current flow to the GFI 22 below its trip setting.

Figure 2:
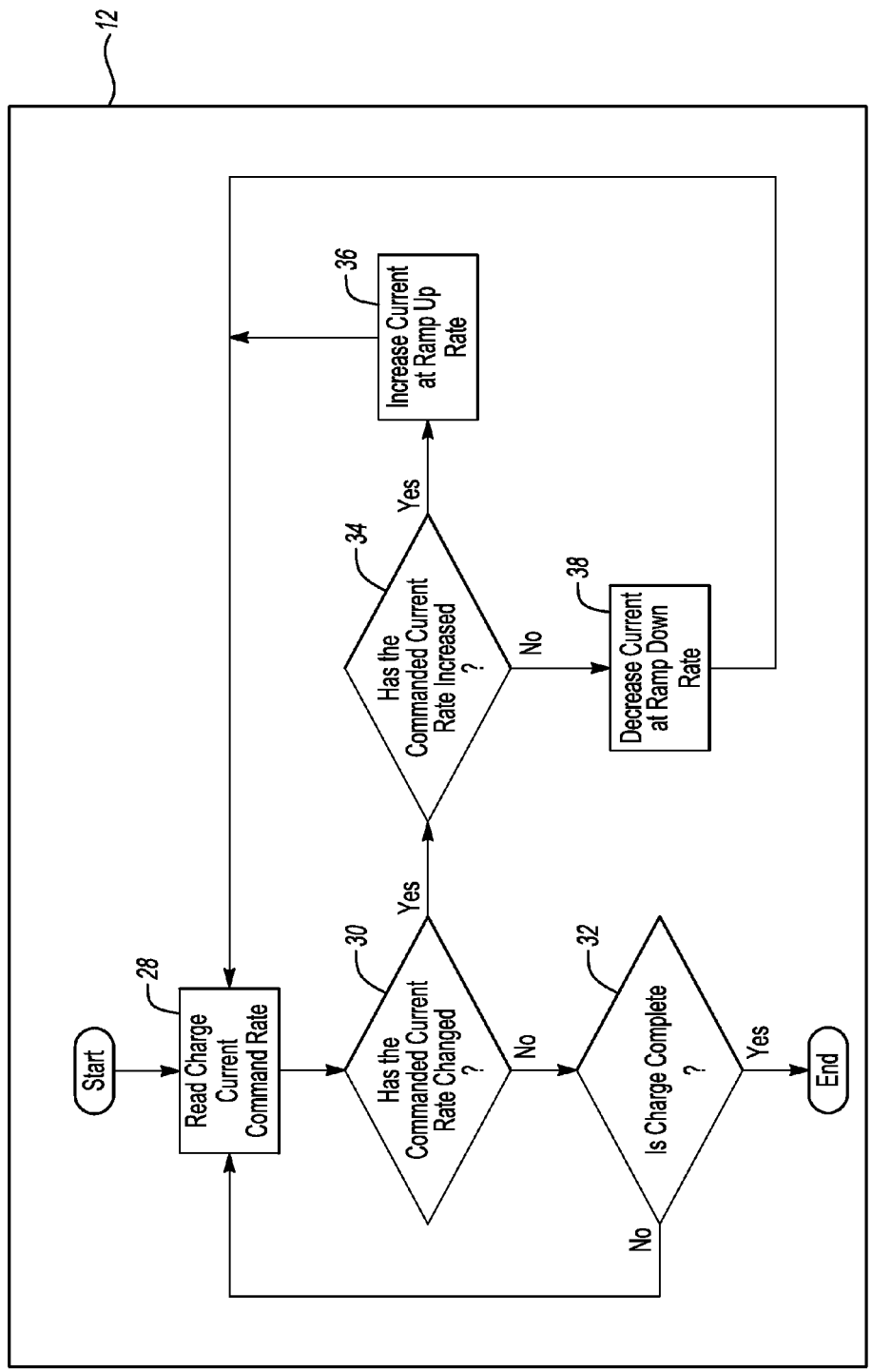
FIG. 2 is a flow chart depicting an algorithm for controlling current flow through the circuitry and chassis of FIGS. 1A and 1B.

Referring to FIGS. 1 and 2, the charge current command is read at operation 28. The battery charger 12, for example, may read (e.g., determine, measure, etc.) the commanded charge current specified by the controller 18. At operation 30, it is determined whether the commanded charge current has changed. The battery charger 12, for example, may determine whether a previously commanded charge current is different from a currently commanded charge current. If no, it is determined whether the charge current is equal to the commanded charge current at operation 32. For example, the battery charger 12 may determine whether the current provided to the traction battery 14 and/or +12V battery is equal to the commanded charge current from the controller 18. If no, the algorithm returns to operation 28. If yes, the algorithm ends.

Returning to operation 30, if yes, it is determined whether the commanded charge current has increased at operation 34. The battery charger 12, for example, may determine whether a previously commanded charge current is less than a currently commanded charge current. If yes, the current may be increased at a selected rate at operation 36. For example, the battery charger 12 may increase the current output at a rate of 0.5 A/sec. The algorithm then returns to operation 28. If no, the current may be decreased at a selected rate at operation 38. For example, the battery charger 12 may decrease the current output at a rate of 50 A/sec. The algorithm then returns to operation 28. The selected rates at which to increase and/or decrease current to the loads 14, 16 so as to limit the chassis coupling current may be determined via testing, simulation, etc. Certain designs may, of course, permit/require other rates than those listed above.

As apparent from the above, the rate at which current is increased may differ from the rate at which current is decreased. Testing has revealed that, in certain designs, rapid increases in charge current created far greater coupling currents than rapid decreases. Moreover, battery analysis has revealed that a fast response to overvoltage conditions during charging is desirable.

The algorithms disclosed herein may be deliverable to/performed by a processing device, such as the battery charger 12 or controller 18, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. An automotive vehicle comprising:
   a battery charger configured to receive electrical energy, via an electrical connection including a ground wire, from an electrical source remote from the vehicle and to output the electrical energy to at least one electrical load; and
   at least one controller configured to command a change in the electrical energy output by the battery charger, wherein the battery charger is further configured to, in response to the command, control a rate of change in the electrical energy output such that a coupling current to the ground wire resulting from the change in the electrical energy output by the battery charger has a magnitude less than a predetermined threshold.

2. The vehicle of claim 1 wherein the electrical energy output by the battery charger comprises a current, wherein the commanded change comprises a commanded increase in the current or a commanded decrease in the current, and wherein the controlled rate of change for current increases is different than the controlled rate of change for current decreases.

3. The vehicle of claim 2 wherein the controlled rate of change for current increases is less than the controlled rate of change for current decreases.

4. The vehicle of claim 1 wherein the predetermined threshold is approximately equal to a trip setting of a ground fault interrupter associated with the ground wire.

5. The vehicle of claim 1 wherein the coupling current is proportional to the change in the electrical energy output of the battery charger.

6. An automotive vehicle having a chassis comprising:
   a battery;
   a battery charger having an electrical input and an electrical output, wherein the electrical input is electrically connected with the chassis and configured to receive electrical energy from a source remote from the vehicle and wherein the electrical output is electrically coupled with the chassis and configured to provide at least a portion of the received electrical energy to the battery; and
   a controller configured to command an increase or decrease in the electrical energy provided by the battery charger to the battery, wherein the battery charger is further configured to, in response to the command, control a rate of change in the electrical energy provided to the battery such that a current that flows from the electrical output, through the chassis and to the electrical input resulting from the change in the electrical energy provided by the battery charger has a magnitude less than a predetermined threshold.

7. The vehicle of claim 6 wherein the electrical energy provided by the battery charger to the battery comprises a current and wherein the controlled rate of change for current increases is different than the controlled rate of change for current decreases.

8. The vehicle of claim 7 wherein the controlled rate of change for current increases is less than the controlled rate of change for current decreases.

9. The vehicle of claim 6 wherein the predetermined threshold is approximately equal to a trip setting of a ground fault interrupt associated with the electrical input.

10. The vehicle of claim 6 wherein the electrical output is electrically coupled to the chassis via a capacitance and wherein the magnitude of the current is proportional to the product of the capacitance and a change in voltage between the battery charger and battery per unit time.

11. A method for controlling a vehicle battery charge current comprising:
    by at least one controller,
      monitoring a command for a change in battery charge current; and
      in response to the command, controlling a rate of change in current provided to a vehicle battery such that a magnitude of a chassis coupling current resulting from the change in battery charge current is less than a predetermined threshold.

12. The method of claim 11 wherein the rate of change for increases in current provided to the vehicle battery is different than the rate of change for decreases in current provided to the vehicle battery.

13. The method of claim 11 wherein the rate of change for increases in current provided to the vehicle battery is less than the rate of change for decreases in current provided to the vehicle battery.

14. The method of claim 11 wherein the predetermined threshold is in the range of 4 to 6 mA.

15. The vehicle of claim 11 wherein the magnitude of the chassis coupling current is proportional to the change in battery charge current.

* * * * *